United States Patent
Morita et al.

(10) Patent No.: US 8,354,359 B2
(45) Date of Patent: Jan. 15, 2013

(54) HEAT-SENSITIVE ADHESIVE AGENT AND HEAT-SENSITIVE ADHESIVE SHEET

(75) Inventors: Mitsunobu Morita, Numazu (JP); Takehito Yamaguchi, Numazu (JP); Takayuki Sasaki, Mishima (JP); Hitoshi Shimbo, Shizuoka (JP); Yutaka Kuga, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1030 days.

(21) Appl. No.: 11/899,868

(22) Filed: Sep. 7, 2007

(65) Prior Publication Data

US 2008/0176012 A1 Jul. 24, 2008

(30) Foreign Application Priority Data

Sep. 11, 2006 (JP) .................................. 2006-245951

(51) Int. Cl.
*B41M 5/20* (2006.01)

(52) U.S. Cl. ..................... 503/207; 503/227; 428/32.39; 428/32.5; 428/347; 428/349

(58) Field of Classification Search ............... 428/32.39, 428/200, 347, 349, 32.5; 503/207, 227
See application file for complete search history.

(56) References Cited

U.S. PATENT DOCUMENTS

| | | | | |
|---|---|---|---|---|
| 5,342,649 | A * | 8/1994 | Sarokin ......................... | 427/150 |
| 5,457,080 | A * | 10/1995 | Takano et al. ................. | 503/207 |
| 6,156,835 | A | 12/2000 | Anderson et al. | |
| 6,428,900 | B1 | 8/2002 | Wang | |
| 7,452,595 | B2 | 11/2008 | Morita et al. | |
| 2006/0068191 | A1 | 3/2006 | Goto et al. | |
| 2007/0112113 | A1 | 5/2007 | Yamaguchi et al. | |

FOREIGN PATENT DOCUMENTS

| | | |
|---|---|---|
| JP | 61-9479 | 1/1986 |
| JP | 62-21835 | 5/1987 |
| JP | 5-221137 | 8/1993 |
| JP | 6-57223 | 3/1994 |
| JP | 6-57226 | 3/1994 |
| JP | 6-25869 | 4/1994 |
| JP | 6-100847 | 4/1994 |
| JP | 6-100848 | 4/1994 |
| JP | 7-278521 | 10/1995 |
| JP | 19527789 A1 | 2/1996 |
| JP | 08333565 A * | 12/1996 |
| JP | 9-111212 | 4/1997 |
| JP | 2683733 | 8/1997 |
| JP | 9-235528 | 9/1997 |
| JP | 9-265260 | 10/1997 |
| JP | 10-152660 | 6/1998 |
| JP | 11-279495 | 10/1999 |
| JP | 2000-103969 | 4/2000 |
| JP | 2000-191922 | 7/2000 |
| JP | 2000-212527 | 8/2000 |
| JP | 2001-64401 | 3/2001 |
| JP | 2001-234151 | 8/2001 |
| JP | 2001-262117 | 9/2001 |
| JP | 2002-38123 | 2/2002 |
| JP | 2002-88678 | 3/2002 |
| JP | 2002-114953 | 4/2002 |
| JP | 2002-146303 | 5/2002 |
| JP | 2002-173662 | 6/2002 |
| JP | 2002-338935 | 11/2002 |
| JP | 2004-117941 | 4/2004 |
| JP | 3556414 | 5/2004 |
| JP | 2006-111865 | 4/2006 |
| JP | 3922688 | 3/2007 |
| WO | WO01/12447 A1 | 2/2001 |
| WO | WO01/66666 A2 | 9/2001 |

OTHER PUBLICATIONS

Machine translation of detailed description of JP 08-333565 A. Created on Jul. 1, 2010.*
Machine translation of detailed description of JP 2000-103969 A. Created on Jul. 1, 2010.*
"Hectorite" from http://www.handbookofmineralogy.org/pdfs/hectorite.pdf. Published 2001.*
"Hectorite Mineral Data" from http://webmineral.com/data/Hectorite.shtml. Created on Jul. 1, 2010.*
Search report in connection with a counterpart European patent application No. 07 11 6031.
*Handbook of Adhesives*, 12th Ed., Kobunshi Kankokai (1980), pp. 131-135 (and English translation thereof).
Sep. 1, 2010 Chinese official action (and English translation) in connection with counterpart Chinese patent application.
Oct. 15, 2010 European official action in connection with counterpart European patent application No. 07116031.

* cited by examiner

*Primary Examiner* — Gerard Higgins
(74) *Attorney, Agent, or Firm* — Cooper & Dunham LLP

(57) ABSTRACT

Provided is a heat-sensitive adhesive agent that mainly comprises a thermoplastic resin and a heat-meltable substance capable of melting upon heating, and further comprises swellable mica.

16 Claims, 1 Drawing Sheet

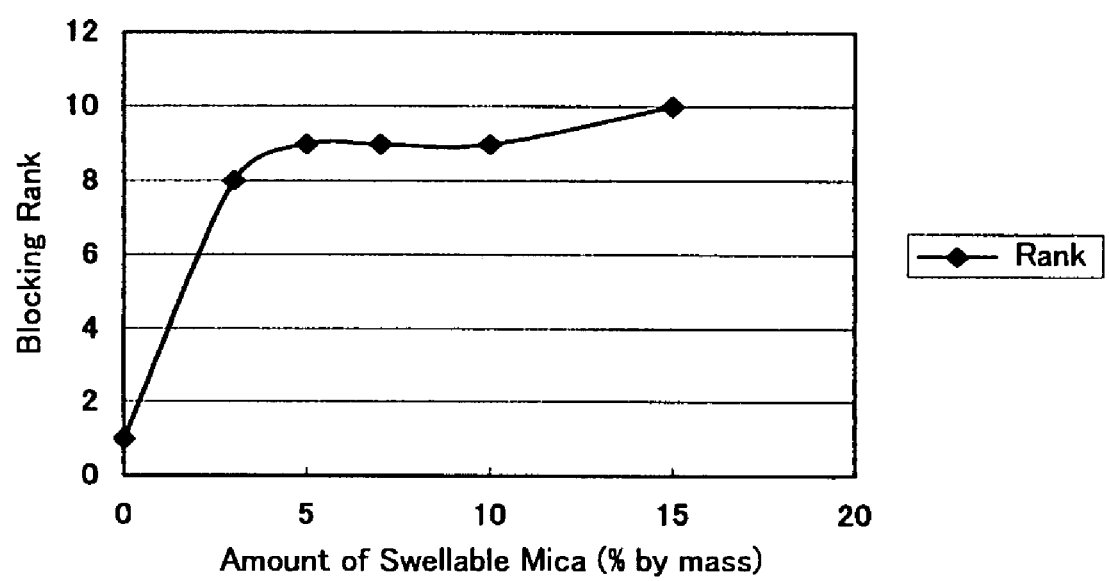

HEAT-SENSITIVE ADHESIVE AGENT AND HEAT-SENSITIVE ADHESIVE SHEET

BACKGROUND

1. Technical Field

This disclosure relates to a heat-sensitive adhesive agent that can generate adhesive ability through heating from room temperature, at which having substantially no adhesive ability, and can maintain the adhesive ability even after generating thereof; and a heat-sensitive adhesive sheet that contains a layer of the heat-sensitive adhesive agent on a support and can exhibit excellent adhesive strength to adherends.

2. Description of the Related Art

Adhesive label sheets have been increasing their application for price-display labels, article-display or bar-code labels, quality-indication labels, mass-indication labels or stickers. Processes for recording on labels have also been developed, such as ink-jet recording processes, heat-sensitive recording processes and pressure-sensitive recording processes.

These adhesive label sheets typically have a construction that an adhesive layer and a peeling paper are laminated on the surface opposite to information-recording surface of labels, and have been widely used since the sheets can be conveniently laminated by way of simply removing the peeling paper and pressing them when laminating. The adhesive label sheets are typically applied after removing the peeling paper; however, the peeling papers are discarded in almost all cases since it is difficult to collect and recycle the removed peeling papers. Accordingly, heat-sensitive label sheets with a heat-sensitive adhesive layer have been attracting attention in recent years that exhibit substantially no adhesive ability at room temperature and thus require no peeling paper (Japanese Utility Model Application Laid-Open No. 06-25869).

The heat-sensitive adhesive layer in such heat-sensitive adhesive label sheets contains a thermoplastic resin, a heat-meltable substance, and an optional tackifier (Adhesion Handbook, 12th edition, pp. 131-135, 1980, by Kobunshi Kankoukai Ltd.). However, such a heat-sensitive adhesive layer suffers from various problems including decrease of adhesive strength with time after generating the adhesive ability, lower adhesive strength to coarse adherends such as cardboard, or bonding of the heat-sensitive adhesive layer to its backside during storage period in a rolled condition. The adhesive strength to adherends and the blocking resistance typically conflict each other, that is, since increasing the adhesive strength tends to degrade the blocking resistance and improving the blocking resistance tends to lower the adhesive strength to adherends, simultaneous pursuit of the two properties is remarkably difficult and has not been achieved currently.

Ester compounds such as dicyclohexyl phthalate, for example, have been investigated heretofore as the heat-meltable substance in order to improve the adhesive property (see Japanese Patent Application Laid-Open (JP-A) Nos. 61-9479 and 07-278521). The inclusion of the heat-meltable substance tends to enhance the adhesive property to adherends; however, it is impossible to maintain stably the adhesive strength to coarse adherends such as cardboard, and also blocking resistance is considerable poor such that sticking tends to occur during storage period in a rolled condition.

Heat-sensitive adhesive agents containing a phosphorus compound and various sheets produced therefrom are also proposed, which are allegedly excellent in adhesive property to adherends and also exhibit excellent blocking resistance (see JP-A Nos. 2000-103969, 2000-191922, 2000-212527, 2004-117941, 2001-64401, 2001-262117, 2002-88678, 2002-338935, and 2004-117941). Among these, JP-A No. 2000-103969 proposes that a phosphorus compound having a melting point of 85° C. to 100° C. is utilized as the heat-meltable compound or solid plasticizer, thereby a material having a lower melting point can advantageously generate adhesive strength upon heating and the blocking resistance can be excellent. However, such a condition as 140° C. for 30 seconds is also necessary to generate the adhesive property in this proposal, therefore, it will be difficult to generate the adhesive ability by the energy from thermal print heads. That is, the insufficient generation of adhesive strength is practically compensated by the heating or activating condition rather than both of the adhesive strength and the blocking resistance are satisfied at higher level; it is believed that the heat-sensitive adhesive agent is currently insufficient in practical applications in order to be effectively utilized as various media.

It is also publicly known that various fillers may be incorporated as an adhesive agent in addition to the heat-sensitive adhesive agent in order to improve the blocking resistance, which being another object. The Patent Literatures described above disclose addition of conventional inorganic or organic particles as an antiblocking agent into the layer of heat-sensitive adhesive agent.

Specifically, as regards the construction that a layer of heat-sensitive adhesive agent and a layer of thermoplastic resin are disposed on a support, a method is proposed to incorporate a pigment into the layer of thermoplastic resin (see JP-A No. 11-279495), and a method is proposed to incorporate an oil-absorptive pigment (oil absorption number: 100 mL/100 g) into the layer of heat-sensitive adhesive agent that mainly contains a thermoplastic resin and a solid plasticizer (see JP-A No. 09-235528). However, both of the methods incorporate the pigment, which disturbing adhesion, into the outermost layer, therefore, the adhesive strength to adherends is lowered, that is, these methods are far from simultaneous pursuit of the blocking resistance and the adhesive strength and thus are impractical. In addition, a method is proposed to compound a lubricant wax into a heat-sensitive adhesive agent (see Japanese Patent Application Publication No. 62-21835), a method is proposed to protect the surface of the heat-meltable substance by means of inorganic compounds or colloid particles (see JP-A Nos. 06-57223, 06-100847 and 06-100848), and a method is proposed to use a filler having a porous crystalline structure as an inorganic filler in the layer of heat-sensitive adhesive agent (see JP-A No. 2002-114953). However, these proposals also tend to lower the adhesive strength to adherends and to be far from simultaneous pursuit of the blocking resistance and the adhesive strength.

BRIEF SUMMARY

In an aspect of this disclosure, there is provided a heat-sensitive adhesive agent that satisfies both of the adhesive strength and the blocking resistance, that is, a heat-sensitive adhesive agent that exhibits improved blocking resistance without decreasing the adhesive strength (adhesion inhibition), and to provide a heat-sensitive adhesive sheet that utilizes the heat-sensitive adhesive agent.

This disclosure is made based on the finding that inclusion of a swellable mica can maintain the adhesive strength to adherends such as wraps and cardboard at high level and also can impart excellent blocking resistance during storage period in a rolled condition (heated and pressed).

The aforementioned swellable mica refers to mica substances such as sodium tetrasilicon mica and sodium hectorite. The swellable mica differs from non-swellable one in that the swellable mica, when being added with water, swells through taking water molecules into between its layers and disperses in water as fine particles. The swellable mica also has a variety of properties like film-forming capability and ion-exchange capability.

Specific examples thereof are sodium tetrasilicon mica (DMA-350, DMA-80E), sodium hectorite (NHT-70B), and these aqueous dispersions (NTS-5, NTS-10, NHT-sol B2) (produced by TOPY Industries, Ltd.); swellable mica Somashif (ME-100, S1ME, by Corp Chemical Co.) is also commercially available. As such, various swellable micas are available. These swellable micas may be surface-treated by coupling agents or silicone oils.

In actual use, the swellable mica may be dispersed into water to prepare a dispersion or commercially available aqueous dispersions may be used.

The application of the swellable mica is novel as far as the present inventors know; the mechanism, to which the swellable mica contributes for simultaneous pursuit of the adhesive strength and the blocking resistance, is not necessarily clear yet, but is estimated as follows.

The swellable mica has a very high aspect ratio, and represents a condition of dispersion while taking water molecules into between its layers under an environment where water being present, in which the mica exists as thin particles having a surface area of several 10 μm and a thickness of several nm (about 2 to 10 nm). The swellable mica has a tendency to form a laminate by cohesion force acting between opposing faces through cations, therefore, it is believed that the swellable mica forms partially a condition like film within an adhesive layer or an outermost layer when being compounded in a layer of a heat-sensitive adhesive agent.

There are the particles of heat-meltable substance in addition to thermoplastic resin in the layer of the inventive heat-sensitive adhesive agent, therefore, the surface is somewhat irregular rather than flat; and the swellable mica exists in a condition of very thin layers as described above; it is thus believed that the swellable mica is adaptable so as to conform with the irregularity or shape of surface when laminated near the surface of the layer of the heat-sensitive adhesive agent, resulting in the excellent function to prevent blocking.

On the other hand, the swellable mica can generate the excellent function to prevent blocking in a very small amount (thin condition), therefore, it is believed that the function to prevent blocking is easily eliminated when the layer of heat-active adhesive agent is activated to generate the adhesive ability, consequently, the adhesive ability can be maintained (generated) as well as the blocking resistance can be exercised. By the way, when the layer of the heat-sensitive adhesive agent, added with the swellable mica, is observed at the outermost layer by use of an electron microscope, it is viewed that the swellable mica exists in a very thin condition so that the film of the swellable mica is almost impossible to be confirmed clearly; nevertheless, the blocking resistance can be exercised. It is believed that the simultaneous pursuit of the adhesive strength and the blocking resistance can be consequently attained in contrast to conventional various inorganic and organic fillers. Meanwhile, when non-swellable mica having a layered structure is utilized as an inorganic filler, the function like the swellable mica cannot be exercised.

As the added amount of the swellable mica increases, there appears a tendency to decrease the adhesive strength, therefore, it is preferred that the amount of the swellable mica as the dried mass is 5 to 20 parts, more preferably about 5 to 10 parts, based on 100 parts by dried mass of the thermoplastic resin contained in the layer of the heat-sensitive adhesive agent. The range described above can attain the simultaneous pursuit of the adhesive strength and the blocking resistance at high level. The term "dried mass" corresponds to the mass of the condition that an aqueous coating liquid is coated and then the moisture is evaporated with or without intentional heating, consequently, the coated ingredients occur no dropout from the support.

The following additional aspects are also discussed herein:

<1> A heat-sensitive adhesive agent, mainly comprising a thermoplastic resin and a heat-meltable substance capable of melting upon heating, and further comprising swellable mica.

<2> The heat-sensitive adhesive agent according to <1>, wherein the swellable mica is sodium tetrasilicon mica or sodium hectorite.

<3> The heat-sensitive adhesive agent according to <1> or <2>, wherein the amount of the swellable mica is 5 to 20 parts by dried mass based on 100 parts by dried mass of the thermoplastic resin.

<4> The heat-sensitive adhesive agent according to <3>, wherein the amount of the swellable mica is 5 to 10 parts by dried mass based on 100 parts by dried mass of the thermoplastic resin.

<5> The heat-sensitive adhesive agent according to any one of <1> to <4>, comprising triphenylphosphine as the heat-meltable substance.

<6> A heat-sensitive adhesive sheet, comprising a support, and a layer of a heat-sensitive adhesive agent disposed on one side of the support, wherein the layer of the heat-sensitive adhesive agent is formed of the heat-sensitive adhesive agent according to any one of <1> to <5>.

<7> The heat-sensitive adhesive sheet according to <6>, wherein an intermediate layer, which mainly comprising hollow particles and a binder, is disposed between the support and the layer of the heat-sensitive adhesive agent.

<8> The heat-sensitive adhesive sheet according to <7>, wherein the intermediate layer comprises swellable mica.

<9> The heat-sensitive adhesive sheet according to any one of <6> to <8>, wherein a recording layer, or a recording layer and a protective layer are laminated on the side of the support where the layer of the heat-sensitive adhesive agent being absent.

<10> The heat-sensitive adhesive sheet according to <9>, wherein the recording layer is one of a heat-sensitive recording layer, an ink-receiving layer for heat-melt transfer recording, a toner-image receiving layer for electrophotography, a recording layer for silver halide photography, and an ink-image receiving layer for ink-jet.

<11> The heat-sensitive adhesive sheet according to any one of <6> to <10>, wherein the support is synthetic paper or plastic film.

<12> The heat-sensitive adhesive sheet according to any one of <6> to <11>, having a configuration of label, sheet, label-sheet, or roll.

BRIEF DESCRIPTION OF THE SEVERAL VIEWS OF THE DRAWING

FIG. 1 is a graph that shows a relation between the amount of swellable mica and blocking resistance.

DETAILED DESCRIPTION OF THE INVENTION

The present invention will be explained more specifically in the following. The heat-sensitive adhesive agent will be explained at first. The heat-sensitive adhesive agent mainly comprises a thermoplastic resin and a heat-meltable substance, and further comprises swellable mica and optional other ingredients such as tackifier. By the expression "mainly comprise", an ingredient is indicated that is essential in order to provide the heat-sensitive adhesive agent, i.e. the function cannot be generated without the ingredient. The contents of these ingredients, which usually amount to 70 to 80% by mass or more, depend on the combination of materials and are difficult to define the values definitely.

Thermoplastic Resin

The thermoplastic resin may be properly selected depending on the application; it is preferred that this thermoplastic resin and the thermoplastic resin used for the intermediate layer described above are the same species, since the adhesive strength to coarse adherends such as cardboard is enhanced due to higher compatibility of resins in both layers.

Examples thereof include natural rubber latexes containing graft-copolymerized vinyl monomers, acrylate copolymers, methacrylate copolymers, acrylate-methacrylate copolymers, acrylate-styrene copolymers, acrylate-methacrylate-styrene copolymers, and ethylene-vinyl acetate copolymers. These may be used alone or in combination.

The content of the thermoplastic resin is preferably 10 to 60% by mass, more preferably 15 to 50% by mass. When the content is below 10% by mass or above 60% by mass, the adhesive strength tends to decrease undesirably. When the content of low Tg resin is above 60% by mass, such a problem during storage (blocking) may arise as an adhesive strength generates under usual storage condition.

Heat-Meltable Substance

The heat-meltable substance cannot impart thermoplasticity to resins at room temperature since being solid, but melts upon heating and swells or softens resins to generate adhesive ability and crystallizes slowly after heating and melting, thus can sustain the adhesive ability for a long time after removing heat source.

The heat-meltable substance is exemplified by the benzotriazole compounds expressed by Chemical Formula (1), the hydroxybenzoate compounds expressed by Chemical Formula (2), compounds expressed by Chemical Formulas (3) to (5), and compounds expressed by Chemical Formulas (6) and (7). These may be used alone or in combination.

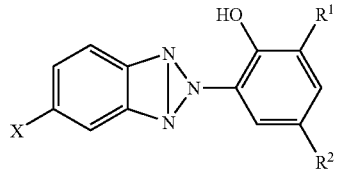

Chemical Formula (1)

$R^1$ and $R^2$ in Chemical Formula (1), which may be identical or different each other, each represents a hydrogen atom, an alkyl group or an α,α-dimethylbenzyl group; X represents a hydrogen atom or a halogen atom.

The alkyl group is preferably those having 1 to 8 carbon atoms; specific examples thereof include methyl group, ethyl group, n-propyl group, n-butyl group, n-pentyl group, n-hexyl group and n-heptyl group; these groups may be further substituted by a substituent. Examples of the substituent include hydroxyl group, halogen atoms such as fluorine, chlorine, bromine and iodine; nitro group, carboxyl group, cyano group; and alkyl groups, aryl groups and heterocyclic groups that may substituted by a specific substituent such as halogen atoms and nitro group.

Specific examples of benzotriazole compounds expressed by Chemical Formula (1) include 2-(2'-hydroxy-5'-methylphenyl)benzotriazole, 2-(2'-hydroxy-5'-t-octylphenyl)benzotriazole, 2-(2'-hydroxy-3'-t-butyl-5'-methylphenyl)-5-chlorobenzotriazole, 2-(2'-hydroxy-3',5'-di-t-amylphenyl)benzotriazole, 2-(2'-hydroxy-3',5'-t-butylphenyl)-5-chlorobenzotriazole, 2-[2'-hydroxy-3',5'-di(1,1-dimethylbenzyl)phenyl]benzotriazole, 2-(2'-hydroxy-3',5'-di-t-butylphenyl)benzotriazole, and 2-(2'-hydroxy-3'-s-butyl-5'-t-butylphenyl)benzotriazole, but not limited to these compounds. These compounds may be used alone or in combination of two or more.

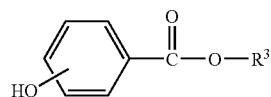

Chemical Formula (2)

$R^3$ in Chemical Formula (2) may be one of alkyl groups, alkenyl groups, aralkyl groups and aryl groups; these may be further substituted by a substituent.

The alkyl groups may be those having 1 to 18 carbon atoms; examples thereof include linear alkyl groups such as methyl group, ethyl group, n-propyl group, n-butyl group, n-pentyl group, n-hexyl group, n-heptyl group, n-octyl group, n-nonyl group and n-decyl group; branched alkyl groups such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-propylhexyl group, 1-isobutyl-3-methylbutyl group, neopentyl group, t-butyl group, t-hexyl group, t-amyl group and t-octyl group; cycloalkyl groups such as cyclohexyl group, 4-methylcyclohexyl group, 4-ethylcyclohexyl group, 4-t-butylcyclohexyl group, 4-(2-ethylhexyl)cyclohexyl group, bornyl group, isobornyl group and adamantyl group; these may be further substituted by a substituent.

The alkenyl groups described above are preferably those having 2 to 8 carbon atoms; examples thereof include vinyl group, aryl group, 1-propenyl group, methacrylic group, crotyl group, 1-butenyl group, 3-butenyl group, 2-pentenyl group, 4-pentenyl group, 2-hexenyl group, 5-hexenyl group, 2-heptenyl group and 2-octenyl group; these may be further substituted by a substituent.

The aralkyl group may be properly selected depending on the application; examples thereof include benzyl group, phenylethyl group and phenylpropyl group; these may be further substituted by a substituent.

Examples of the aryl groups include phenyl group, naphthyl group, anthranil group, fluorenyl group, phenalenyl group, phenanthranyl group, triphenylenyl group and pyrenyl group; these may be further substituted by a substituent.

Examples of the substituents of the alkyl groups, alkenyl groups, aralkyl groups, and aryl groups include hydroxyl group, halogen atoms, nitro group, carboxyl group, cyano group; and alkyl groups, aryl groups and heterocyclic groups that may be substituted by a specific substituent such as halogen atoms and nitro group.

Specific examples of the hydroxybenzoate compounds expressed by Chemical Formula (2) include m-hydroxymethylbenzoate, m-hydroxyethylbenzoate, m-hydroxyphenylbenzoate, p-hydroxymethylbenzoate, p-hydroxyethylbenzoate, p-hydroxy n-propylbenzoate, p-hydroxy n-butylbenzoate, p-hydroxy stearylbenzoate, p-hydroxy cyclohexylbenzoate, p-hydroxybenzylbenzoate, p-hydroxy 4-chlorobenzylbenzoate, p-hydroxy 4-methylbenzylbenzoate, and p-hydroxy phenylbenzoate, but not limited to these compounds. These compounds may be used alone or in combination of two or more.

Chemical Formula (3)

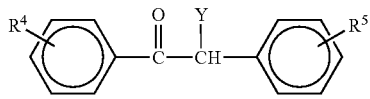

$R^4$ and $R^5$ in Chemical Formula (3), which may be identical or different each other, each represents an alkyl group or an alkoxy group; Y represents a hydrogen atom or a hydroxyl group.

Chemical Formula (4)

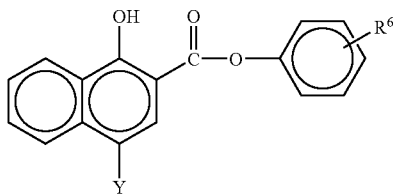

$R^6$ in Chemical Formula (4) represents a hydrogen atom, a halogen atom, an alkyl group, or an alkoxy group; Y represents a hydrogen atom or a hydroxyl group.

Chemical Formula (5)

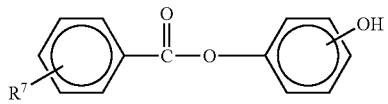

$R^7$ in Chemical Formula (5) represents a hydrogen atom, a halogen atom, an alkyl group, or an alkoxy group.

The alkyl groups in Chemical Formulas (3) to (5) may be similar as those of Chemical Formula (1).

Examples of the alkoxy groups include methoxy group, ethoxy group, propyloxy group, i-propyloxy group, butoxy group, i-butoxy group, t-butoxy group, pentyloxy group, hexyloxy group, cyclohexyloxy group, heptyloxy group, octyloxy group, 2-ethylhexyloxy group, nonyloxy group, decyloxy group, 3,7-dimethyloctyloxy group and lauryloxy group.

Specific examples of the compounds expressed by Chemical Formula (3) include toluoin, anisoin, m-anisoin, deoxytoluoin, deoxyanisoin, 4,4'-diethylbenzoin and 4,4'-diethoxybenzoin, but not limited to these compounds. These compounds may be used alone or in combination of two or more.

Specific examples of the compounds expressed by Chemical Formula (4) include phenyl-1-hydroxy-2-naphthoate, p-chlorophenyl-1-hydroxy-2-naphthoate, o-chlorophenyl-1-hydroxy-2-naphthoate, p-methylphenyl-1-hydroxy-2-naphthoate, o-methylphenyl-1-hydroxy-2-naphthoate, phenyl-1,4-dihydroxy-2-naphthoate, p-chlorophenyl-1,4-dihydroxy-2-naphthoate and o-chlorophenyl-1,4-dihydroxy-2-naphthoate, but not limited to these compounds. These compounds may be used alone or in combination of two or more.

Specific examples of the compounds expressed by Chemical Formula (5) include 3-hydroxyphenyl benzoate, 4-hydroxyphenyl benzoate, 2-hydroxyphenyl benzoate, o-methylbenzoate-3-hydroxyphenyl and p-chlorobenzoate-3-hydroxyphenyl, but not limited to these compounds. These compounds may be used alone or in combination of two or more.

Chemical Formula (6)

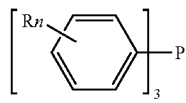

Chemical Formula (7)

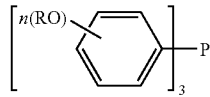

R in Chemical Formulas (6) and (7) represents an unbranched or branched alkyl group of 1 to 4 carbon atoms such as methyl group, ethyl group, propyl group, butyl group and t-butyl group; "n" is an integer of 1 to 5.

Specific examples of the compounds expressed by Chemical Formula (6) include triphenylphosphine, tri-m-tolylphosphine, tri-p-tolylphosphine, tri-o-tolylphosphine, tri-2,4-xylenephosphine, tri-2,5-xylenephosphine, tri-2,6-xylenephosphine, tri-3,4-xylenephosphine and tri-3,5-xylenephosphine, but not limited to these compounds. These compounds may be used alone or in combination of two or more.

Specific examples of the compounds expressed by Chemical Formula (7) tris(o-methoxyphenyl)phosphine, tris(m-methoxyphenyl)phosphine, tris(p-methoxyphenyl)phosphine, tris(p-ethoxyphenyl)phosphine, tris(p-n-propyloxyphenyl)phosphine, tris(m-t-butoxyphenyl)phosphine, tris(m-n-butoxyphenyl)phosphine, tris(p-n-butoxyphenyl)phosphine, tris(p-t-butoxyphenyl)phosphine and tris(m-t-butoxyphenyl)phosphine, but not limited to these compounds. These compounds may be used alone or in combination of two or more.

Other compounds than those expressed by Chemical Formulas (1) to (7) may be used as the inventive heat-meltable substance, as long as being solid at room temperature and capable of being mixed with the thermoplastic resins upon heating and melting; examples thereof include 2,2-ethylidene-bis-(4,6-di-t-butylphenol), bis(3,5-di-t-butyl-4-hydroxybenzyl)sulfide, 2-(3,5-di-t-butyl-4-hydroxybenzyl)-2-n-butylmalonate bis(1,2,2,6,6-pentamethyl-4-piperidyl), 1,6-hexanediol bis[3-(3,5-di-t-butyl-4-hydroxyphenyl)propionate], 3,9-bis[2-[3-(3-t-butyl-4-hydroxy-5-methylphenyl)propionyloxy]-1,1-dimethylethyl]-2,4-6-(1H,3H,5H)trione, 2,4-di-t-pentylphenyl-3,5-di-t-butyl-4-hydroxybenzoate, 2,2'-methylenebis[6-(1-methylcyclohexyl)-p-cresol], 4,4'-methylenebis(2,6-di-t-butylphenol), 1,4-dihydroxy-2-phenylnaphthoate, 2,2'-butylidenebis(4-methyl-6-t-butylphenol), 2,2',4,4'-tetrahydroxybenzophenone, 4-benzyloxy-2-hydroxybenzophenone, 2-(4,6-diphenyl-1,3,5-triazine-2-yl)-5[(hexyl)oxy]phenol, 6-[3-(3-t-butyl-4-hydroxy-5-methylpropoxy)-2,4,8,10-tetra-t-butyl dibenz[d,f][1,3,2]]-dioxaphosphorine, amide phosphate, 2-(4'-molpholinodithio)benzothiazole, 1-o-tolylbiguanide, o,o'-dibenzamidodiphenyldisulfide and tris(2,4-di-t-butylphenyl)phosphite.

In the present invention, the combination of triphenylphosphine as the heat-meltable substance and the swellable mica can attain the simultaneous pursuit of the blocking resistance and the adhesive strength at still higher level. In this case, it is necessary that triphenylphosphine is included in the heat-sensitive adhesive agent as the heat-meltable substance; the triphenylphosphine may be used alone or in combination with the compounds of Chemical Formulas (1) to (6) described above.

It is not necessarily clear the reason why triphenylphosphine can lead to such high properties, but is estimated as follows.

When triphenylphosphine is included into the layer of the heat-sensitive adhesive agent as the heat-meltable substance, the layer of the heat-sensitive adhesive agent can take a considerably softened condition when being heated, thus the layer as well as the coexisting swellable mica having a function to prevent blocking can improve the adhesive property as well as the blocking resistance. That is, when the blocking resistance is improved by the swellable mica and also the heated heat-sensitive adhesive agent contains triphenylphosphine, it is believed that the layer of heat-sensitive adhesive agent can come to the outermost layer through the spaces of the blocking-proof layer of the swellable mica by virtue of the softness of the layer.

The compounds expressed by Chemical Formulas (1) to (7) are preferably solid at room temperature and meltable upon heating. The melting point of these compounds is preferably 70° C. or higher, more preferably 80° C. or higher; and the upper limit is about 200° C.

When the melting point is below 70° C., there arise storage problems like blocking such that the heat-sensitive adhesive agent yields adhesion strength under temperatures of ordinal storage environment. There may arise production problems such that the heat-sensitive adhesive agent yields adhesion strength when being applied on a support and dried. On the other hand, when the melting point is above 200° C., there may arise practical problems such that a large amount of energy is required to generate adhesive strength. There may also arise problems when adhesive strength is yielded by a large amount of energy using heat-sensitive recording paper as a support such that the heat-sensitive recording layer is colored and printed images are illegible.

The heat-meltable substance expressed by Chemical Formulas (1) to (7) may be used after milling into the size of 10 μm or less in terms of a volume average particle diameter, preferably 3 μm or less. When the volume average particle diameter is still lowered into the size of 0.5 μm or less, for example, the dynamic heat-sensitivity is enhanced, thereby the heat-meltable substance may be made compatible with the thermoplastic resin and the tackifier with lower energy to form the heat-sensitive adhesive agent.

The heat-meltable substance may be used alone or combinations of compounds of Chemical Formulas (1) to (7) in any rate, and the compounding rate may be optionally selected.

The milling of the heat-meltable substance may be carried out in a condition of aqueous dispersion, where one or more of various aqueous polymers such as polyvinyl alcohol and cellulose derivatives or various surfactants such as nonionic and anionic ones may be used together with the heat-meltable substance. Among these, polyvinyl alcohol is preferable in view of excellent protective colloid performance and ability to form stable dispersion condition. The polyvinyl alcohol is preferably one having a mass average molecular mass of 11,000 to 39,000 from the viewpoint that the adhesive strength as well as the protective colloid performance are enhanced since excessively large molecular mass tends to decrease the adhesive strength.

Tackifier

The tackifier is added in order to enhance the adhesive strength of the layer of the heat-sensitive adhesive agent, and may be properly selected from conventional ones; examples thereof include rosin and rosin derivatives such as polymer rosin and hydrogenated rosin; terpene resin and modified terpene resins such as aromatic modified terpene resins, terpene phenol resins and hydrogenated terpene resins; petroleum resins, phenol resins and xylene resins. These tackifiers may be made compatible with the thermoplastic resin and the heat-meltable substance thereby to enhance remarkably the adhesive strength of the layer of the heat-sensitive adhesive agent.

The melting point or softening point of the tackifier is preferably 80° C. or higher, more preferably 80° C. to 200° C. When the melting point or softening point of the tackifier is below 80° C., such a storage problem as decrease of blocking resistance may arise under temperatures of usual storage condition.

The content of the tackifier is preferably 1 to 30% by mass in the heat-sensitive adhesive agent, more preferably 1 to 20% by mass. When the content is below 1% by mass, the adhesive strength may be considerably low, and when the content is above 30% by mass, a storage problem such as decrease of blocking resistance may arise under temperatures of usual storage condition or initial adhesive strength may be less at low temperature environment.

Filler Etc.

Besides the swellable mica, which being employed for the function to prevent blocking in the present invention, various fillers may be added in a range free from impairing the performance of the swellable mica. The filler may be conventional inorganic or organic pigments having a volume average particle diameter of 0.5 to 20 μm, or organic-inorganic complex pigments.

Examples of the inorganic pigments include calcium carbonate, silica, titanium oxide, aluminum hydroxide, clay, calcined clay, magnesium silicate, magnesium carbonate, white carbon, zinc oxide, barium sulfate, surface-treated calcium carbonate and non-swellable mica.

Examples of the inorganic pigment include fine particles of benzoguanamine-formaldehyde condensates, benzoguanamine-melamine-formaldehyde condensates, melamine-formaldehyde condensates, polymethylmethacrylate crosslinked products, polybutylmethacrylate crosslinked products, urea-formaldehyde resins, styrene-methacrylic acid copolymers, and polystyrene resins. Particles of these organic pigments processed into a porous structure may be available, such as porous particles of polymethylmethacrylate crosslinked products.

Examples of the organic-inorganic complex pigments include silica-acryl complex compounds, silicone particles with excellent demolding ability such as of silicone rubbers and silicone resins, and also complex particles of silicone rubbers and silicone resins.

Among these filler materials, organic pigments with excellent demolding ability are preferable, in particular, silicone particles and polymethylmethacrylate crosslinked products are preferable. These resin particles may exhibit their effect by virtue of the excellent demolding ability in terms of blocking resistance themselves and also the spherical structure. In addition, the damage to thermal heads may be low at generating adhesive ability and thus superior matching may be attained, with respect to the generation or activation of the adhesive ability at thermal heads.

The heat-sensitive adhesive sheet will be explained in the following.

The inventive heat-sensitive adhesive sheet is formed of the layer of the heat-sensitive adhesive agent on one side of the support, and also an intermediate layer or an under layer may be disposed between the support and the layer of the heat-sensitive adhesive agent, and still other optional layers may be provided. In addition, various layers such as a recording layer or a protective layer may be provided on the side of the support where the layer of the heat-sensitive adhesive agent being absent.

Support

The shape, structure, and size of the support may be properly selected depending on the application; for example, the shape may be planar, the structure may be of monolayer or laminate, and the size may be properly selected depending on the size of the heat-sensitive adhesive sheet.

The material of the support may be properly selected depending on the application, and may be one of inorganic materials and organic materials. Examples of the inorganic materials include glass, quartz, silicon, silicon oxide, aluminum oxide, $SiO_2$, and metals.

Examples of the organic materials include paper such as high quality paper, art paper, coated paper, and synthetic paper; cellulose derivatives such as cellulose triacetate; polyester resins such as polyethylene terephthalate (PET) and polybutylene terephthalate; polyolefins such as polycarbonate, polystyrene, polymethylmethacrylate, polyamide, polyethylene and polypropylene. Among these, high quality paper, coated paper, plastic films and synthetic papers are preferable, and plastic films and synthetic papers are preferable in particular.

Specific examples of the synthetic papers are those based on synthetic fibers such as polyethylene, polypropylene, polyethylene terephthalate, and polyamide, and those including such synthetic papers in part, on one side, or on both sides. Examples of commercially available synthetic paper are FPG, FGS, GFG, and KPK (produced by Yupo Corporation).

The supports of plastic film or synthetic paper typically provide inferior infiltration of heat-sensitive adhesive agent and remarkably low anchor effect compared to high quality paper or old paper formed of pulp. Recently, contact activation processes by use of thermal heads have been attracting attention on the grounds of safety, high-speed, and on-demand in thermal activation systems. In the contact activation processes by use of thermal heads, the active layer tends to be shaved unfortunately, the layer of heat-sensitive adhesive agent falls off remarkably in particular since the thermal head comes to a high temperature for activating the entire surface of labels in the thermal activation. The present invention may prevent the dropout or shrinkage of plastic film or synthetic paper during the thermal activation even when plastic film or synthetic paper is employed for the support, and also the adhesive residue may be excluded during label exchanges.

Preferably, the support is surface-treated by way of corona discharge, oxidizing by chromate etc., etching, adhesion-promotion, static elimination, etc. in order to enhance the adhesive property. Preferably, the support is made white by adding a white pigment such as titanium oxide. The thickness of the support may be properly selected depending on the application; preferably, the thickness is 50 µm to 2000 µm, more preferably 100 µm to 1000 µm.

Layer of Heat-Sensitive Adhesive Agent

The layer of the heat-sensitive adhesive agent may be properly formed on the support by way of conventional coating or printing processes; for example, a coating liquid of the heat-sensitive adhesive agent is applied by a coating process thereby the layer of the heat-sensitive adhesive agent may be appropriately formed.

The coating process may be one of blade coating processes, gravure coating processes, gravure offset coating processes, bar coating processes, roll coating processes, knife coating processes, air knife coating processes, comma coating processes, U-comma coating processes, AKKU coating processes, smoothing coating processes, micro gravure coating processes, reverse roll coating processes, 4-roll or 5-roll coating processes, dip coating processes, drop-curtain coating processes, slide coating processes, and die coating processes.

The drying conditions in the coating or printing processes should be selected at a temperature range where the heat-meltable substance or other ingredients are far from melting-fusing. The drying process may be by use of hot-wind or heat sources such as infra-red ray, micro wave and radio-frequency radiation.

The coated amount of the coating liquid of the layer of the heat-sensitive adhesive agent is preferably 5 to 30 $g/m^2$ as dried mass, more preferably 10 to 20 $g/m^2$. When the coated amount is below 5 $g/m^2$, the adhesive strength to coarse adherends such as cardboard tends to be low. On the other hand, when the coated amount is above 30 $g/m^2$, the energy necessary to generate the adhesive ability to the layer of the heat-sensitive adhesive agent is likely to be excessively large and the heat-insulating effect of the intermediate layer, if present, is undesirably poor; and, of course, economical efficiency is inferior.

Intermediate Layer (Under Layer)

The intermediate layer, which being provided between the support and the layer of the heat-sensitive adhesive agent, contains a thermoplastic resin of binder, a pigment (filler), and other optional ingredients. The pigment is particularly preferably hollow particles (hollow filler) in view of heat response to generate adhesive ability. The intermediate layer may contain the swellable mica. In such a case, the swellable mica may prevent the migration of resin ingredients from the intermediate layer into the layer of the heat-sensitive adhesive agent without impairing the cushioning ability or the heat-insulating property of the intermediate layer, and thus the adhesive ability as well as the blocking resistance can be attained at higher level.

Thermoplastic Resin

The thermoplastic resin may be properly selected depending on the application; examples thereof include natural rubber latexes containing graft-copolymerized vinyl monomers, acrylate copolymers, methacrylate copolymers, acrylate-methacrylate copolymers, acrylate-styrene copolymers, acrylate-methacrylate-styrene copolymers, ethylene-vinyl acetate copolymers, styrene-butadiene copolymers, acryl-acrylonitrile copolymers, methylmethacrylate-butadiene copolymers, polybutadiene, 2-vinylpyridine-styrene-butadiene-copolymers, and acrylonitrile-butadiene copolymers. These may be used alone or in combination.

Pigment (Filler)

The pigment may be properly selected from conventional inorganic or organic fillers having a volume average particle diameter of 0.5 to 10 µm.

Examples of the inorganic fillers include calcium carbonate, silica, titanium oxide, aluminum hydroxide, clay, calcined clay, magnesium silicate, magnesium carbonate, white carbon, zinc oxide, barium sulfate, and surface-treated calcium carbonate and silica.

Examples of the organic fillers include fine particles of urea-formaldehyde resins, styrene-methacrylic acid copolymers, and polystyrene resins.

Among these, plastic spherical hollow particles, having a volume average particle diameter of 2.0 to 5.0 µm and an hollow ratio of 70% or more, are preferable due to appropriate heat-insulating effect in view of heat activation at lower energy or high-sensitive heat activation. More preferable are hollow particles, in which the maximum particle diameter of the hollow particles is 10.0 µm or less, the volume average particle diameter is 2.0 to 5.0 µm, and the hollow ratio is 70% or more. When the hollow ratio is low, the effect of high-sensitive heat activation is poor, since the heat energy from thermal heads is dissipated outward through supports due to insufficient heat-insulating effect. When the volume average particle diameter is larger than 5.0 µm, the layer of the heat-sensitive adhesive agent disposed on the intermediate layer having the hollow particles may include areas at larger particles where no layer of the heat-sensitive adhesive agent exists, thus the adhesive strength tends to decrease upon heat-activation, and when the volume average particle diameter is smaller than 2.0 µm, it is difficult to achieve the hollow ratio of 70% or higher, consequently, the effect of high-sensitive heat activation may be poor. Particularly preferable materials are acrylonitrile-vinylidene chloride-methylmethacrylate copolymers and acrylonitrile-methacrylonitrile-isobonyl methacrylate copolymers etc.

The plastic spherical hollow particles means those having a shell of thermoplastic resins and gas like air therein thereby to form hollow particles having an expanded condition. The hollow ratio means the ratio of the volume of inside space to entire volume of the hollow particles (volume of inside space/ entire volume).

The intermediate layer may be properly formed by conventional processes; for example, a coating liquid of intermediate layer containing the ingredients described above is coated by a coating process thereby to form appropriately the intermediate layer.

The coating process may be one of blade coating processes, gravure coating processes, gravure offset coating processes, bar coating processes, roll coating processes, knife coating processes, air knife coating processes, comma coating processes, U-comma coating processes, AKKU coating processes, smoothing coating processes, micro gravure coating processes, reverse roll coating processes, 4-roll or 5-roll coating processes, dip coating processes, drop-curtain coating processes, slide coating processes, and die coating processes.

The coated amount of the coating liquid of the intermediate layer is preferably 1 to 35 g/m$^2$ as dried mass, more preferably 2 to 25 g/m$^2$. When the coated amount is below 1 g/m$^2$, the adhesion strength may be insufficient when the adhesion being carried out by heating and/or the heat-insulating effect may be poor, and the coated amount of above 35 g/m$^2$ may be economically undesirable since the adhesive strength and/or the heat-insulating effect may be saturated.

The inventive heat-sensitive adhesive sheet may have a recording layer, or a recording layer and a protective layer, and other optional layers on the side of the support where the layer of the heat-sensitive adhesive agent being absent.

The recording layer may be properly selected depending on the application; preferable example of the recording layer is one of a heat-sensitive recording layer, an ink-receiving layer for heat-melt transfer recording, a toner-image receiving layer for electrophotography, a recording layer for silver halide photography, and an ink-image receiving layer for ink-jet. Among these, a heat-sensitive adhesive sheet for heat-sensitive recording that has a heat-sensitive recording layer containing a leuco dye and a developer, and a heat-sensitive adhesive sheet for heat-transfer recording that has an ink-receiving layer for heat-melt transfer recording are significantly useful since the adhesive strength is high to various adherends, in particular to coarse adherends such as cardboard or polyolefin wrap, the energy to heat-activate is low, and the blocking resistance is adequate.

An intermediate layer may be disposed between the support and the heat-sensitive recording layer. The ingredients of these layers may be pigments like hollow particles, binders, heat-meltable substances and surfactants described above.

Heat-Sensitive Adhesive Sheet for Heat-Sensitive Recording

The heat-sensitive recording layer of heat-sensitive adhesive agent for heat-sensitive recording comprises a coloring agent, a developer, a binder resin, and other optional ingredients.

The leuco dye may be selected from conventional ones depending on the application; examples thereof include triphenyl methane dyes, fluoran dyes, phenothiazine dyes, auramine dyes, spiropyran dyes and indolinophtalide dyes.

Specific examples of the leuco dye include the following compounds: 3,3-bis(p-dimethylaminophenyl)phthalide, 3,3-bis(p-dimethylaminophenyl)-6-dimethylaminophthalide (or crystal violet lactone), 3,3-bis(p-dimethylaminophenyl)-6-diethylaminophthalide, 3,3-bis(p-dimethylaminophenyl)-6-chlorophthalide, 3,3-bis(p-dibuthylaminophenyl)phthalide, 3-cyclohexylamino-6-chlorofluoran, 3-dimethylamino-5,7-dimethylfluoran, 3-diethylamino-7-chlorofluoran, 3-diethylamino-7-methylfluoran, 3-diethylamino-7,8-benzofluoran, 3-diethylamino-6-methyl-7-chlorofluoran, 3-(N-p-tolyl-N-ethylamino)-6-methyl-7-anilinofluoran, 3-pyridino-6-methyl-7-anilinofluoran, 2-[N-(3'-trifluoromethylphenyl) amino]-6-diethylaminofluoran, 2-[3,6-bis(diethylamino)-9-(o-chloroanilino)xanthyl benzoic acid lactam, 3-diethylamino-6-methyl-7-(m-trichloromethylanilino)fluoran, 3-diethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyrohexylamino-6-methyl-7-anilinofluoran, 3-diethylamino-6-methyl-7-anilinofluoran, 3-(N,N-diethylamino)-5-methyl-7-(N,N-dibenzylamino)fluoran, benzoyl leuco methylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl)phthalide, 3-(2'-hydroxy-4'-dimethylaminophenyl)-3-(2'-methoxy-5'-nitrophenyl) phthalide, 3-(2'-hydroxy-4'-diethylaminophenyl)-3-(2'-methoxy-5'-methylphenyl)phthalide, 3-diethylamino-6-methyl-7-(2',4'-dimethylanilino)fluoran, 3-(2'-methoxy-4'-dimethylaminophenyl)-3-(2'-hydroxy-4'-chloro-5'-methylphenyl)phthalide, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5- chloro-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-(N-benzyl-N-cyclohexylamino)-5,6-benzo-7-α-naphthylamino-4'-o-bromofluoran, 3-diethylamino-6-methyl-7-mesitidino-4',5'-benzofluoran, 3-diethylamino-6-methyl-7-(2',4'-dimethylanilino)fluoran, 3-(p-dimethylaminophenyl)-3-[1,1-bis(p-dimethylaminophenyl)ethylene-2-yl]phthalide, 3-(p-dimethylaminophenyl)-3-[1,1-bis(p-dimethylaminophenyl)-ethylene-2-yl]-6-dimethylaminophthalide, 3-(p-dimethylaminophenyl)-3-(1-p-dimethylaminophenyl-1-phenylethylene-2-yl)phthalide, 3-(p-dimethylaminophenyl)-3-(1-p-dimethylaminophenyl-1-p-chlorophenylethylene-2-yl)-6-dimethylaminophthalide, 3-(4'-dimethylamino-2'-methoxy)-3-(1"-p-dimethylaminophenyl-1"-p-chlorophenyl-1",3"-buthadiene-4"-yl)benzophthalide, 3-(4'-dimethylamino-2'-benzyloxy)-3-(1"-p-dimethylaminophenyl-1"-phenyl-1",3"-butadiene-4"-yl)benzophthalide, 3-dimethylamino-6-dimethylaminofluorene-9-spiro-3'-(6'-dimethylamino)phthalide, 3,3-bis[2-(p-dimethylaminophenyl)-2-(p-methoxyphenyl)ethenyl]-4,5,6,7-tetrachlorophthalide, 3-bis[1,1-bis(4-pyrrolidinophenyl)ethylene-2-yl]-5,6-dichloro-4,7-dibromophthalide, bis(p-dimethylaminostyryl)-1-naphthalenesulfonylmethane, 3-(N-methyl-N-propylamino)-6-methyl-7-anilidofluoran, 3-diethylamino-6-methyl-7-anilinofluoran, 3,6-bis(dimethylamino)fluoranspiro(9,3')-6'-dimethylaminophthalide, 3-diethylamino-6-chloro-7-anilinofluoran, 3-N-ethyl-N-(2-ethoxypropyl)amino-6-methy-7-anilinofluoran, 3-N-ethyl-N-tetrahydrofurfurylamino-6-methyl-7-anilinofluoran, 3-diethylamino-6-methyl-7-mesitidino-4',5'-benzofluoran, 3-N-methyl-N-isobutyl-6-methyl-7-anilinofluoran, and 3-N-ethyl-N-isoamyl-6-methyl-7-anilinofluoran.

These may be used alone or in combination.

The developer may be properly selected from conventional electron-accepting compounds such as phenol compounds, thiophenol compounds, thiourea derivatives, organic acid and metal salts thereof.

Specific examples of the developers include 4,4'-isopropylidenebisphenol, 3,4'-isopropylidenebisphenol, 4,4'-isopropylidenebis(o-methylphenol), 4,4'-sec-butylidenebisphenol, 4,4'-isopropylidenebis(o-tert-butylphenol), 4,4'-cyclohexylidenediphenol, 4,4'-isopropylidenebis(2-chlorophenol), 2,2'-methylenebis(4-ethyl-6-tert-butylphenol), 2,2'-methylenebis(4-methyl-6-tert-butylphenol), 4,4'-butylidenebis(6-tert-butyl-2-methyl)phenol, 1,1,3-tris(2-methyl-4-hydroxy-5-tert-butylphenyl)butane, 1,1,3-tris(2-methyl-4-hydroxy-5-cyclohexylphenyl)butane, 4,4'-thiobis(6-tert-butyl-2-methyl)phenol, 4,4'-diphenolsulfone, 4,2'-diphenolsulfone, 4-isopropoxy-4'-hydroxydiphenylsulfone, 4-benzyloxy-4'-hydroxydiphenylsulfone, 4,4'-diphenolsulfoxide, isopropyl-p-hydroxybenzoate, benzyl-p-hydroxybenzoate, benzyl-protocatechuate, stearylgallate, laurylgallate, octylgallate, 1,7-bis(4-hydroxyphenylthio)-3,5-dioxaheptane, 1,5-bis(4-hydroxyphenylthio)-3-oxapentane, 1,3-bis(4-hydroxyphenylthio)propane, 2,2'-methylenebis(4-methyl-6-tert-butylphenol), 1,3-bis(4-hydroxyphenylthio)-2-hydroxypropane, N,N'-diphenylthiourea, N,N'-di(m-chlorophenyl)thiourea, salicylanilide, 5-chlorosalicylanilide, salicyl-o-chloroanilide, 2-hydroxy-3-naphthoic acid, antipyrine complex of thiocyanic acid, zinc salt of 2-acetyloxy-3-naphthoic acid, 2-acetyloxy-1-naphthoic acid, 1-acetyloxy-2-naphthoic acid, metal salts of hydroxyl naphthoic acid (e.g. Zn, Al, Ca), bis(4-hydroxyphenyl)methylacetate, bis(4-hydroxyphenyl)benzylacetate, 4-[β-(p-methoxyphenoxy)ethoxy]salicylic acid, 1,3-bis(4-hydroxycumyl)benzene, 1,4-bis(4-hydroxycumyl)benzene, 2,4'-diphenolsulfone, 3,3'-diallyl-4,4'-diphenolsulfone, antipyrine complex of α,α-bis(4-hydroxyphenyl)-α-methyltoluene zinc thiocyanate, tetrabromobisphenol A, tetrabromobisphenol S, 4,4'-thiobis(2-methyiphenol), 3,4-dihydroxyphenyl-4'-methyldiphenylsulfone, and 4,4'-thiobis (2-chlorophenol). These may be used alone or in combination.

The added amount of the developer into the heat-sensitive recording layer may be properly selected depending on the application; preferably, the amount of the developer is 1 to 20 parts by mass based on 1 part by mass of the coloring agent, more preferably 2 to 10 parts by mass.

The binder resin may be properly selected from conventional ones; examples thereof include polyvinyl alcohols; starch and its derivatives; cellulose derivatives such as methoxy cellulose, hydroxyethyl cellulose, carboxymethyl cellulose, methyl cellulose, and ethyl cellulose; water-soluble polymers such as sodium polyacrylate, polyvinylpyrrolidone, acrylamide-acrylate copolymer, acrylamide-acrylate-methacrylic acid terpolymer, alkali metal salts of styrene-maleic anhydride copolymer, alkali metal salts of isobutylene-maleic anhydride copolymer, polyacrylamide, sodium alginate, gelatin, and casein; emulsions such as polyvinyl acetate, polyurethane, polyacrylic acid, polyacrylate, polymethacrylate, polybutylmethacrylate, vinyl chloride-vinyl acetate copolymer, and ethylene-vinyl acetate copolymer; and latexes such as styrene-butadiene copolymer, and styrene-butadiene-acryl terpolymer. These binders may be used alone or in combination.

The heat-sensitive recording layer may contain various heat-meltable substances; examples thereof include fatty acids such as stearic acid and behenic acid; fatty acid amides such as stearic acid amide and palmitic acid amide; fatty acid metal salts such as zinc stearate, aluminum stearate, calcium stearate, zinc palmitate and zinc behenate; p-benzylbiphenyl, terphenyl, triphenyl methane, benzyl p-benzyloxybenzoate, β-benzyloxynaphthalene, phenyl-β-naphthoate, phenyl-1-hydroxy-2-naphthoate, methyl-1-hydroxy-2-naphthoate, diphenyl carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-bisphenoxybutane, 1,4-bisphenoxy-2-butene, dibenzoylmethane, 1,4-diphenylthiobutane, 1,4-bisphenylthio-2-butene, 1,2-bis(4-methoxyphenylthio)ethane, 1,3-bis(2-vinyloxyethoxy)benzene, 1,4-bis(2-vinyloxyethoxy)benzene, p-(2-vinyloxyethoxy)biphenyl, p-aryloxybiphenyl, p-propagyloxybiphenyl, dibenzoyloxymethane, 1,3-dibenzoyloxypropane, dibenzyldisulfide, 1,1-diphenylethanol, 1,1-diphenylpropanol, p-benzyloxybenzylalcohol, 1,3-phenoxy-2-propanol, N-octadecylcarbamoyl-p-methoxycarbonylbenzene, N-octadecylcarbamoylbenzene, dibenzyl oxalate, and 1,5-bis(p-methoxyphenyloxy)-3-oxapentane. These may be used alone or in combination.

The heat-sensitive recording layer may contain various additional ingredients such as surfactants and lubricants depending on the application. Examples of the lubricants include higher fatty acids and metal salts thereof, higher fatty acid amide, higher fatty acid ester, animal waxes, vegetable waxes, mineral waxes, and petroleum waxes.

The heat-sensitive recording layer may be formed by way of conventional methods. For example, the a leuco dye and a color developer were individually divided by use of mills such as a ball mill, Atritor and sand mill to a particle size of 1 µm to 3 µm along with a binder and other ingredients. Then the leuco dye, color developer, and other optional ingredients such as loading material, hot melt substance or sensitivity enhancer, and dispersant are compounded and blended under a pre-determined formulation, thereby to prepare a coating liquid of the heat-sensitive recording layer, and the coating liquid is coated on the support to form the heat-sensitive recording layer.

The thickness of the heat-sensitive recording layer depends on the composition of the heat-sensitive recording layer and the application of heat-sensitive adhesive in general; usually the thickness is preferably 1 µm to 50 µm, more preferably 3 µm to 20 µm.

Heat-Sensitive Adhesive Sheet for Heat-Melt Transfer Recording

The ink-receiving layers for thermal transfer recording of the heat-sensitive materials contain a filler, binder resin, waterproof agent, and the other optional ingredients.

The filler may be properly selected depending on the application; examples thereof include calcium carbonate, silica, titanium dioxide, aluminum hydroxide, clay, calcined clay, magnesium silicate, magnesium carbonate, white carbon, zinc oxide, barium sulfate, surface-treated calcium carbonate and silica, and fine powders of urea-formaldehyde resin, styrene-methacrylic acid copolymer, and polystyrene.

The binder resin may be properly selected depending on the application; examples thereof include polyvinyl alcohols; starch and its derivatives; cellulose derivatives such as methoxy cellulose, hydroxyethyl cellulose, carboxymethyl cellulose, methyl cellulose, and ethyl cellulose; water-soluble polymers such as sodium polyacrylate, polyvinylpyrrolidone, acrylamide-acrylate copolymer, acrylamide-acrylate-methacrylic acid terpolymer, alkali metal salts of styrene-maleic anhydride copolymer, alkali metal salts of isobutylene-maleic anhydride copolymer, polyacrylamide, sodium alginate, gelatin, and casein. These binders may be used alone or in combination.

The ratio of the filler and the water-soluble resin in the ink-receiving layers affects the blocking property; preferably, the mass ratio of the filler to the water-soluble resin is 1:0.1 to 1:0.2 on the base of solid content.

The waterproof agent may be properly selected depending on the application; examples thereof include formaldehyde, glyoxal, chrome alum, melamine, melamine-formaldehyde resins, polyamide resins, and polyamide-epichlorohydrin resins.

The ratio of the waterproof agent and the water-soluble resin affects the blocking property. Preferably, the ratio of the waterproof agent is 0.3 part by mass to 0.5 part by mass to 1 part by mass of the water-soluble resin on the base of solid content. As such, the ink-receiving layer may contain the filler, water-soluble resin, and waterproof agent in various ratios. In addition, the surface-treated ink-receiving later by a calendaring process to a smoothness of 500 seconds or higher for example, may further enhance the printing quality beside the effect of the filler.

Protective Layer

The protective layer contains an ingredient(s) of resin(s) and other optional ingredients. The resin may be an emulsion of hydrophobic resin or aqueous resin, preferably, the resin is an aqueous resin in view of barrier property as the protective layer. In cases of aqueous resin, the resin can be waterproof by action of crosslinker thereby to improve the function.

Polyvinyl alcohol is usually employed as the aqueous resin, and is appropriately combined with a crosslinker to make waterproof. The combination is exemplified by a carboxy-modified polyvinyl alcohol and a polyamide epichlorohydrin resin, or a polyvinyl alcohol having a reactive carbonyl group (hereinafter referred to as "reactive PVA") and a hydrazide compound.

Among them, the protective layer, containing the reactive PVA and the hydrazide compound as the crosslinking agent, may have significantly high heat resistance and water resistance and unlikely to be affected by pressure, temperature, or humidity, thus may exhibit remarkably improved blocking resistance.

The reactive PVA may be prepared by way of conventional processes, for example, allowing to react a vinyl monomer having a reactive carbonyl group and a vinyl ester of fatty acid to prepare a copolymer, then saponifying the copolymer. The reactive carbonyl group of the vinyl monomer may be a residual group of an ester or an acetone group; preferably, the vinyl monomer having a reactive carbonyl group is a vinyl monomer having a diacetone group, more specifically, diacetone acrylamide and meta-diacetone acrylamide are preferable. The vinyl ester of fatty acid is exemplified by vinyl formate, vinyl acetate and vinyl propionate; among these, vinyl acetate is particularly preferable.

The reactive PVA may be copolymerized with other copolymerizable vinyl monomers. Examples of the copolymerizable vinyl monomers include acrylic acid esters, butadiene, ethylene, propylene, acrylic acid, methacrylic acid, maleic acid, maleic anhydride and itaconic acid.

The content of the reactive carbonyl group in the reactive PVA is preferably 0.5 to 20% by mole, more preferably 2 to 10% by mole in view of waterproof. The content of less than 2% by mole tends to be insufficient waterproof, and the content of above 10% is not economical since the waterproof property saturates and the cost is expensive. The polymerization degree of the reactive PVA is preferably 300 to 3000, more preferably 500 to 2200. It is preferred that the saponification degree of the PVA having a reactive carbonyl group is 80% or more.

The hydrazide compound may be properly selected depending on the application; examples thereof include carbohydrazide, dihydrazide oxalate, hydrazide formate, hydrazide acetate, dihydrazide malonate, dihydrazide succinate, dihydrazide adipate, hydrazide azelate, dihydrazide sabacate, dihydrazide didodecanoate, dihydrazide maleate, hydrazide fumarate, dihydrazide itaconate, hydrazide benzonate, dihydrazide glutarate, hydrazide diglycolate, dihydrazide tartrate, dihydrazide malate, hydrazide isophthalate, dihydrazide terephthalate, dihydrazide 2,7-naphthoate, and hydrazide polyacrylate. The hydrazide compounds may be used alone or in combination. Among these, dihydrazide adipate is preferable from the standpoint of water resistance and safety.

Preferably, the content of the hydrazide compound is 5 parts by mass to 40 parts by mass, more preferably 15 parts by mass to 25 parts by mass based on the reactive PVA.

Preferably, the protective layer contains a filler. Preferably, the filler is of basic; examples thereof include aluminum hydroxide, calcium carbonate, talc, and basic silicates. Among these, aluminum hydroxide and calcium carbonate are preferable from the viewpoint of matching with thermal heads, e.g. residual substances adhered to the thermal head. Especially preferable is aluminum hydroxide owing to the moderate water solubility adapted to control the pH.

The protective layer may be formed by conventional processes; for example, a coating liquid of the protective layer is prepared in accordance with an usual process, and the coating liquid is coated on the recording layer thereby to prepare the protective layer. The thickness of the protective layer may be properly selected depending on the application; preferably, the thickness is 1.0 to 7.0 μm.

The inventive heat-sensitive adhesive sheet may be used through cutting it before or after heat-activating the layer of the heat-sensitive adhesive agent. By way of forming cut lines previously into the heat-sensitive adhesive sheet, the sheet can be utilized for various applications conveniently such as labels and tags.

The shape of the inventive heat-sensitive adhesive sheet may be properly selected depending on the application; preferable shape is of label, sheet, label-sheet, or roll. Among these, it is preferred that the inventive heat-sensitive adhesive sheet is taken up around a cylindrical core from an elongated sheet into a roll and then is stored.

The size, shape, structure, and material of adherends, to which the inventive heat-sensitive adhesive sheet being adhered, may be properly selected depending on the application; examples of the material include resin plates of polyolefins such as polyethylene and polypropylene, or of acryl, polyethylene terephthalate (PET), polystyrene and nylon; metal plates such as of SUS and aluminum; paper products such as envelopes and cardboard; wraps such as of polyolefin and polyvinyl chloride; and nonwoven fabric of polyethylene (envelops etc.).

The process to heat-activate the layer of heat-sensitive adhesive agent in the inventive heat-sensitive adhesive sheet may be properly selected depending on the application; for example, activation processes by use of hot-wind, hot-rolls, or thermal heads are exemplified.

Among these, the activation processes by use of thermal heads are preferable; in particular, such a process is preferable that both sides of the heat-sensitive adhesive sheet are heated by use of conventional heat-sensitive recording printers, and the recording on the heat-sensitive recoding layer and heat-activation of the layer of the heat-sensitive adhesive agent are carried out simultaneously.

In accordance with the present invention, the blocking resistance can be enhanced without decreasing the adhesive strength to coarse surface, that is, the heat-sensitive adhesive agent, which can attain the contradictory properties such as higher adhesive strength as well as blocking resistance, and the heat-sensitive adhesive sheet, which utilizes the heat-sensitive adhesive agent, are provided. The inventive heat-sensitive adhesive sheet can represent excellent blocking resistance such that the sheet is far from an adhered phenomenon during storage period in a rolled condition before generating adhesive ability or activating thereof caused by heating.

EXAMPLES

The present invention will be explained more specifically with reference to Examples, but to which the present invention should in no way be limited. In the descriptions below, all "part" and "%" are expressed by mass unless indicated otherwise.

Production of Heat-Sensitive Adhesive Sheet

Preparation of Coating Liquid

A Liquid: Dispersion of Heat-Meltable Substance

The ingredients below were dispersed by use of a sand mill into an average particle diameter of about 1.0 μm to prepare a dispersion of A liquid.

| | |
|---|---|
| Heat-meltable substance | 30.0 parts |
| Polyvinyl alcohol (30% aqueous solution) | 5.0 parts |
| Surfactant (alkylallylsulfonate) | 0.15 part |
| Water | 64.85 parts |

B Liquid: Dispersion of Filler

The ingredients below were dispersed by use of a sand mill into an average particle diameter of about 1.0 μm to prepare a dispersion of B liquid.

| | |
|---|---|
| non-Heat-meltable substance | 30.0 parts |
| Polyvinyl alcohol (30% aqueous solution) | 5.0 parts |
| Surfactant (alkylallylsulfonate) | 0.15 part |
| Water | 64.85 parts |

C Liquid: Mixture Liquid of Thermoplastic Resin

The ingredients below were mixed in the amount below to prepare a mixture liquid of C liquid.

| | |
|---|---|
| Copolymer emulsion[*1)] | 10.0 parts |
| Emulsion of terpene tackifier[2*)] | 6.5 parts |
| A liquid (dispersion of heat-meltable substance) | 33.3 parts |
| Water | 16.7 parts |

[*1)]copolymer of methylmethacrylate-2-ethylhexylacrylate, glass transition temperature Tg: −65° C., non-volatile content: 50%,
[2*)]softening temperature: 150° C., non-volatile content: 50% D liquid: Coating Liquid for Layer of Heat-Sensitive Adhesive Agent To C liquid, B liquid or a dispersion of swellable mica etc. was arranged and added in a necessary amount and mixed to prepare a coating liquid of D liquid.

E Liquid: Coating Liquid for Intermediate Layer (Under Layer)

The ingredients below were mixed in the amount below to prepare a mixture liquid of E liquid.

| | |
|---|---|
| Hollow particles[*1)] | 14.6 parts |
| Copolymer[*2)] | 21.7 parts |
| Water | 63.7 parts |

[*1)]copolymer resin based on acrylonitrile-vinylidene chloride, solid content: 41%, average particle diameter: 3.6 μm, hollow ratio: 90%
[*2)]copolymer of 2-ethylhexylacrylate-methylmetacrylate-styrene, solid content: 55.4%, Tg: −65° C., by Showa Highpolymer Co.

E liquid was coated on the side, having no coated layer, of one-side coated paper of 80 g/m$^2$ (OK Adnithrough, by Oji Paper Co.) as a support in an amount of 5 g/m$^2$ as dried mass and dried to form an intermediate layer.

Then D liquid was coated on the intermediate layer in an amount of 10 g/m$^2$ as dried mass and dried to form a layer of heat-sensitive adhesive agent.

Heat-sensitive adhesive sheets of Examples and Comparative Examples were prepared in accordance with the procedures as described above.

Example 1

A heat-sensitive adhesive sheet was prepared using 2-(2'-hydroxy-3'-t-butyl-5'-methylphenyl)-5-chlorobenzotriazole as a heat-meltable substance, and adding NTS-10 of swellable mica dispersion (solid content 10% of sodium tetrasilicon mica, by TOPY Industries, Ltd.) in an amount of 3 parts by dried mass of the swellable mica based on 100 parts by dried mass of the thermoplastic resin at preparing D liquid.

Example 2

A heat-sensitive adhesive sheet was prepared in the same manner as Example 1, except that the added amount of the swellable mica added at preparing D liquid was changed into 5 parts by dried mass of the swellable mica based on 100 parts by dried mass of the thermoplastic resin.

Example 3

A heat-sensitive adhesive sheet was prepared in the same manner as Example 1, except that the added amount of the swellable mica added at preparing D liquid was changed into 7 parts by dried mass of the swellable mica based on 100 parts by dried mass of the thermoplastic resin.

Example 4

A heat-sensitive adhesive sheet was prepared in the same manner as Example 1, except that the added amount of the swellable mica added at preparing D liquid was changed into 10 parts by dried mass of the swellable mica based on 100 parts by dried mass of the thermoplastic resin.

Example 5

A heat-sensitive adhesive sheet was prepared in the same manner as Example 1, except that the added amount of the swellable mica added at preparing D liquid was changed into 15 parts by dried mass of the swellable mica based on 100 parts by dried mass of the thermoplastic resin.

Example 6

A heat-sensitive adhesive sheet was prepared in the same manner as Example 4, except that the swellable mica dispersion added at preparing D liquid was changed into NHT-sol B2 (5% dispersion of Na hectorite).

Example 7

A heat-sensitive adhesive sheet was prepared in the same manner as Example 4, except that the heat-meltable substance was changed into triphenylphosphine.

Example 8

A heat-sensitive adhesive sheet was prepared in the same manner as Example 4, except that the heat-meltable substance was changed into a 1:1 mixture of 2-(2'-hydroxy-3'-t-butyl-5'-methylphenyl)-5-chlorobenzotriazole and triphenylphosphine.

Example 9

A heat-sensitive adhesive sheet was prepared in the same manner as Example 8, except that no intermediate layer was formed.

Example 10

A heat-sensitive adhesive sheet was prepared in the same manner as Example 8, except that the swellable mica (NTS-10, by TOPY Industries, Ltd.) was added to the coating liquid in an amount of 10 parts by dried mass of the swellable mica based on 100 parts by dried mass of the thermoplastic resin in the intermediate layer to form the intermediate layer.

Comparative Example 1

A heat-sensitive adhesive sheet was prepared in the same manner as Example 1, except that D liquid was changed into C liquid.

Comparative Example 2

A heat-sensitive adhesive sheet was prepared in the same manner as Example 1, except that triphenylphosphine was used as the heat-meltable substance and D liquid was changed into C liquid.

Comparative Example 3

A heat-sensitive adhesive sheet was prepared in the same manner as Example 1, except that a 1:1 mixture of 2-(2'-hydroxy-3'-t-butyl-5'-methylphenyl)-5-chlorobenzotriazole and triphenylphosphine was used as the heat-meltable substance and D liquid was changed into C liquid.

Comparative Example 4

A heat-sensitive adhesive sheet was prepared in the same manner as Example 4, except that B liquid of a filler dispersion, prepared using non-swellable mica (fluoro-phlogopite PDM-20B, by TOPY Industries, Ltd.) as the filler, was employed at preparing D liquid in place of the dispersion of swellable mica, and the filler amount was adjusted to 10 parts by dried mass based on 100 parts by dried mass of the thermoplastic resin.

Comparative Example 5

A heat-sensitive adhesive sheet was prepared in the same manner as Comparative Example 4, except that the amount of the filler was adjusted to 20 parts by dried mass.

Comparative Example 6

A heat-sensitive adhesive sheet was prepared in the same manner as Comparative Example 4, except that silica ($SiO_2$) was employed as the filler.

Comparative Example 7

A heat-sensitive adhesive sheet was prepared in the same manner as Comparative Example 5, except that silica ($SiO_2$) was employed as the filler.

Example 11

A heat-sensitive recording layer was formed on the opposite side of the support, on which the layer of the heat-sensitive adhesive agent being formed, of the heat-sensitive adhesive sheets of Examples 1 to 10 and Comparative Examples 1 to 7 in accordance with procedures as follows.

Preparation of Liquids for Forming Various Coating Layers
Liquid for Intermediate Layer The ingredients below was mixed and dispersed to prepare Liquid for Intermediate Layer.

| | |
|---|---|
| Dispersion of fine hollow particles*[1] | 30 parts |
| Latex of styrene-butadiene copolymer*[2] | 10 parts |
| Water | 60 parts |

*[1]copolymer resin based on vinylidene chloride-acrylonitrile, solid content: 32%, average particle diameter: 3.0 μm, hollow ratio: 92%
*[2]Tg: +4° C.

Liquid for Heat-Sensitive Coloring Layer

The ingredients below were dispersed by use of a sand mill into an average particle diameter of about 1.5 μm to prepare Leuco Dye Dispersion and Developer Dispersion, then Leuco Dye Dispersion and Developer Dispersion were mixed in a ratio of 1:8 and stirred to prepare Liquid for Heat-Sensitive Coloring Layer.

Leuco Dye Dispersion

| | |
|---|---|
| 3-di-n-butylamino-6-methyl-7-anilinofluoran | 20 parts |
| Polyvinyl alcohol (10% aqueous solution) | 10 parts |
| Water | 70 parts |

Developer Dispersion

| | |
|---|---|
| 4-isopropoxy-4'-hydroxydiphenylsulfone | 10 parts |
| Polyvinyl alcohol (10% aqueous solution) | 25 parts |
| Calcium carbonate | 15 parts |
| Water | 50 parts |

Liquid for Protective Layer
Primary Dispersion for Protective Layer

The ingredients below were milled and dispersed by use of a vertical sand mill into an average particle diameter of 1.0 μm or less to prepare Primary Dispersion for Protective Layer.

| | |
|---|---|
| Aluminum hydroxide | 20 parts |
| PVA 10% aqueous solution | 20 parts |
| Water | 40 parts |

Then using Primary Dispersion for Protective Layer described above, Liquid for Protective Layer of the ingredients below was prepared.

| | |
|---|---|
| Primary Dispersion for Protective Layer | 10 parts |
| PVA 10% aqueous solution | 20 parts |
| Epichlorohydrin 12.5% aqueous solution | 5 parts |
| Zinc stearate 30% dispersion | 2 parts |

Liquid for Intermediate Layer described above was coated and dried on the surface of a support in an amount of 4 g/m² as dried mass to dispose a heat-insulating layer.

Then Liquid for Heat-Sensitive Coloring Layer described above was coated and dried on the heat-insulating layer in an amount of 5 g/m² as dried mass to dispose a heat-sensitive coloring layer.

Then Liquid for Protective Layer described above was coated and dried on the heat-sensitive coloring layer in an amount of 3 g/m² as dried mass, and surface-treated by use of a super calender into an Ohken smoothness of 2,000 seconds thereby to form a heat-sensitive recording layer.

The resulting samples were evaluated in terms of adhesive property and blocking resistance as follows.

Evaluation of Adhesive Property

The resulting heat-sensitive adhesive sheets were respectively cut into a rectangle of 40 mm by 150 mm.

The heat-sensitive adhesive sheets were heat-activated by use of a heat-sensitive printer (TH-PMD, by Ohkura Electric Co.) under a head condition of energy 0.40 mJ/dot, 0.50 mJ/dot, printing speed 4 ms/line, and platen pressure 6 kgf/line.

The heat-sensitive adhesive sheets were adhered to an adherend of PVC wrap (Polymer Wrap 300, by Shin-Etsu Chemical Co.) or cardboard (C liner cardboard, JIS specification) along the longitudinal direction using a rubber roller while pressing at 2 kgf, and peeled after 15 hours under a condition of peeling angle 180° and peeling speed 300 mm/min.

The adhesive strength was measured by use of a force gage (Model DPS-5, by IMADA Co.) and the data were read every 0.1 second. The averaged adhesive strength (unit: gf/40 mm) is shown in Table 2. The measurement was carried out at normal condition of 22° C. and 65% RH.

The evaluation criteria of the adhesive strength are as follows:
A: 1000 gf/40 mm≦adhesive strength
B: 500 gf/40 mm≦adhesive strength<1000 gf/40 mm
C: 100 gf/40 mm≦adhesive strength<500 gf/40 mm
D: adhesive strength<100 gf/40 mm Evaluation of Blocking Resistance As for the evaluation of the resulting heat-sensitive adhesive sheets, the surface of the layer of heat-sensitive adhesive agent and the opposite surface (heat-sensitive recording layer) were made contact, and a pressure of 200 gf/cm² was applied to the overlapped sheet under a condition of 60° C. and dry atmosphere for 15 hours. Then the overlapped sheet was peeled at room temperature, and evaluated the blocking resistance in accordance with the criteria shown in Table 1. The rank of 7 or higher is substantially no problem in practical use.

The evaluation criteria of blocking resistance are shown in Table 1, and the evaluation results are shown in Table 2 and FIG. 1. The expressions of "feeing to resist peeling", "peeling sound", "dot-like transfer", and "separation" indicate more serious condition of blocking in this order. The "feeing to resist peeling" refers to a slight sticking even without intentional adhering condition, and "empty mass" within its criterion means that when only upper paper is supported in an overlapped condition of two papers, the lower paper peels and drops spontaneously, even there appears the slight sticking. The "peeling sound" means that there comes a sound when the overlapped two papers are separated; the "dot-like transfer" means that the layer of heat-sensitive adhesive agent is transferred to the backside like a dotted condition; and the "separation" means that the layer of heat-sensitive adhesive agent is peeled or the paper of the backside is broken since the layer of heat-sensitive adhesive agent and the backside are adhered.

TABLE 1

| rank | | feeing to resist peeling | peeling sound | dot-like transfer | separation |
|---|---|---|---|---|---|
| 10 | A | empty mass | | | |
| 9 | | somewhat appear | no sound | | |
| 8 | B | appear | somewhat appear | | |

TABLE 1-continued

| rank | feeing to resist peeling | peeling sound | dot-like transfer | separation |
|---|---|---|---|---|
| 7 | | appear | | |
| 6 | C | | | |
| 5 | | | partially appear | |
| 4 | | | 30% to 50% | |
| 3 | D | | 50% to entire | |
| 2 | | | | partially appear |
| 1 | | | | 30% to 50% |
|   | | | | 50% to entire |

TABLE 2

| | adhesive property at 22° C. (adhesive strength/evaluation) | | | | blocking resistance |
|---|---|---|---|---|---|
| | PVC wrap | | cardboard | | rank/evaluation |
| Ex. 1 | 1450 | A | 1180 | A | 8/B |
| Ex. 2 | 1420 | A | 1050 | A | 9/A |
| Ex. 3 | 1400 | A | 1015 | A | 9/A |
| Ex. 4 | 1380 | A | 1010 | A | 9/A |
| Ex. 5 | 1290 | A | 890 | B | 10/A |
| Ex. 6 | 1350 | A | 1000 | A | 8/B |
| Ex. 7 | 790 | B | 710 | B | 7/B |
| Ex. 8 | 1070 | A | 940 | B | 7/B |
| Ex. 9 | 1040 | A | 680 | B | 7/B |
| Ex. 10 | 1000 | A | 650 | B | 8/B |
| Com. Ex. 1 | 1500 | A | 1200 | A | 4/C |
| Com. Ex. 2 | 800 | B | 700 | B | 1/D |
| Com. Ex. 3 | 1080 | A | 960 | B | 1/D |
| Com. Ex. 4 | 1300 | A | 990 | B | 2/D |
| Com. Ex. 5 | 960 | A | 490 | C | 3/D |
| Com. Ex. 6 | 1210 | A | 840 | B | 2/D |
| Com. Ex. 7 | 720 | B | 430 | C | 3/D |

The results of Table 2 demonstrate that the swellable mica makes possible to attain the blocking resistance as well as the adhesion strength, the both properties are excellent at a content range of 5 to 20% by mass, in particular the level is high at a content range of 5 to 10% by mass. These effects cannot be attained in non-swellable mica or other fillers.

Example 11 demonstrates the case where a heat-sensitive recording layer was formed on the opposite side of the support on which the layer of the heat-sensitive adhesive agent being formed; similarly, heat-sensitive adhesive sheets having the blocking resistance as well as the adhesion strength can be obtained when ink-jet recording layers, heat-transfer ink-receiving layers, or electrophotographic recording layers are formed in place of the heat-sensitive recording layer.

What is claimed is:

1. A heat-sensitive adhesive agent as a coating liquid, comprising a thermoplastic resin and a heat-meltable substance capable of melting upon heating, and further comprising swellable mica, wherein
the swellable mica is sodium hectorite, and
the swellable mica amounts to 5 to 10 parts by dried mass based on 100 parts by dried mass of the thermoplastic resin.

2. The heat-sensitive adhesive agent according to claim 1, wherein the heat-meltable substance comprises triphenylphosphine.

3. The heat-sensitive adhesive agent according to claim 1, wherein the swellable mica is dispersed in water, such that the swellable mica swells when water molecules are introduced between layers of the sodium hectorite.

4. A heat-sensitive adhesive sheet, comprising:
a support, and
a layer of heat-sensitive adhesive agent disposed on one side of the support,
wherein the layer of heat-sensitive adhesive agent is formed from the heat-sensitive adhesive agent as a coating liquid according to claim 1.

5. The heat-sensitive adhesive sheet according to claim 4, wherein an intermediate layer, which comprises hollow particles and a hinder, is disposed between the support and the layer of heat-sensitive adhesive agent.

6. The heat-sensitive adhesive sheet according to claim 5, wherein the intermediate layer further comprises swellable mica.

7. The heat-sensitive adhesive sheet according to claim 4, wherein a recording layer, or a recording layer and a protective layer are laminated on a side of the support where the layer of heat-sensitive adhesive agent is absent.

8. The heat-sensitive adhesive sheet according to claim 7, wherein the recording layer is a heat-sensitive recording layer, an ink-receiving layer for heat-melt transfer recording, a toner-image receiving layer for electrophotography, a recording layer for silver halide photography, or an ink-image receiving layer for ink-jet.

9. The heat-sensitive adhesive sheet according to claim 4, wherein the support synthetic paper or a plastic film.

10. The heat-sensitive adhesive sheet according to claim 4, wherein the heat-sensitive adhesive sheet has a configuration of a label, a sheet, a label-sheet, or a roll.

11. A heat-sensitive adhesive agent as a coating liquid, comprising a thermoplastic resin and a heat-meltable substance capable of melting upon heating, and further comprising swellable mica, wherein
the swellable mica is sodium tetrasilicon mica, and
the swellable mica amounts to 5 to 10 parts by dried mass based on 100 parts by dried mass of the thermoplastic resin.

12. The heat-sensitive adhesive agent according to claim 11, wherein the swellable mica is dispersed in water, such that the swellable mica swells when water molecules are introduced between layers of the sodium tetrasilicon mica.

13. A heat-sensitive adhesive sheet, comprising:
a support, and
a layer of heat-sensitive adhesive agent disposed on one side of the support,
wherein the layer of heat-sensitive adhesive agent is formed from the heat-sensitive adhesive agent as a coating liquid according to claim 11.

14. The heat-sensitive adhesive sheet according to claim 13, wherein the support is a synthetic paper or a plastic film.

15. The heat-sensitive adhesive sheet according to claim 13, wherein the heat-sensitive adhesive sheet has a configuration of a label, a sheet, a label-sheet, or a roll.

16. The heat-sensitive adhesive sheet according to claim 13, wherein a recording layer, or a recording layer and a protective layer are laminated on a side of the support where the layer of heat-sensitive adhesive agent is absent, and the recording layer is a heat-sensitive recording layer, an ink-receiving layer for heat-melt transfer recording, a toner-image receiving layer for electrophotography, a recording layer for silver halide photography, or an ink-image receiving layer for ink-jet.

* * * * *